Oct. 14, 1958

J. W. DERWIN 2,856,564

BARIUM TITANATE CRYSTALS AS A PORTABLE
SOURCE OF ELECTRIC POWER

Filed Jan. 31, 1956

INVENTOR
JOHN W. DERWIN

BY

ATTORNEYS

United States Patent Office 2,856,564
Patented Oct. 14, 1958

2,856,564

BARIUM TITANATE CRYSTALS AS A PORTABLE SOURCE OF ELECTRIC POWER

John W. Derwin, Washington, D. C.

Application January 31, 1956, Serial No. 562,617

3 Claims. (Cl. 315—205)

(Granted under Title 35, U. S. Code (1952), sec. 266)

The invention described herein may be manufactured and used by or for the Government of the United States of America for governmental purposes without the payment of any royalties thereon or therefor.

The present invention relates to a portable source of electrical energy and more particularly to the use of a piezoelectric element in combination with mechanical devices as a primary source of electrical energy in the accumulation of a charge far in excess of that which can be obtained by a single deformation of the element. This invention may be utilized in various operations; for example, the firing of a gaseous discharge tube of the type used in flash photography, or in the initiation of insensitive electrical detonators, or wherever substantial condenser discharges are needed.

Conventionally, a source of direct current, such as batteries, wet or dry, is used to supply the direct current necessary for such operations. Such a source has the disadvantage that the batteries must be recharged or replaced. Another disadvantage is the weight and bulk of such items.

Essentially, the present invention comprises a piezoelectric element such as a polarized disc of barium titanate, which, when deformed intermittently or periodically, produces an alternating current, a condenser, a system of rectifiers or switches, and means for mechanically impressing and relieving, a load intermittently or periodically on the piezoelectric element, the means being powered manually. The invention has the advantage that it may be made small and compact as to be readily portable and constitutes a ready source of electrical energy independent of the use of batteries or a stationary source of electrical current.

One object of the present invention is the provision of a new and improved device constituting a ready source of electrical power which is independent of the use of batteries.

Another object is to provide a portable source of electrical power in which a piezoelectric element is deformed intermittently or periodically by mechanical means to produce electrical power.

A further object is the provision of a device which is small and compact and derives electrical power from the intermittent or periodic deformation of a polarized polycrystalline body consisting essentially of barium titanate, by hand-powered mechanical means.

A still further object is the provision of an electrical device wherein the mechanical means for deforming the polycrystalline body is driven by a hand-wound spring motor and the electrical power is stored in a condenser for eventual use in an operation.

The exact nature of this invention as well as other objects and advantages thereof will be readily apparent from consideration of the following specification relating to the annexed drawings in which.

Figure 1:
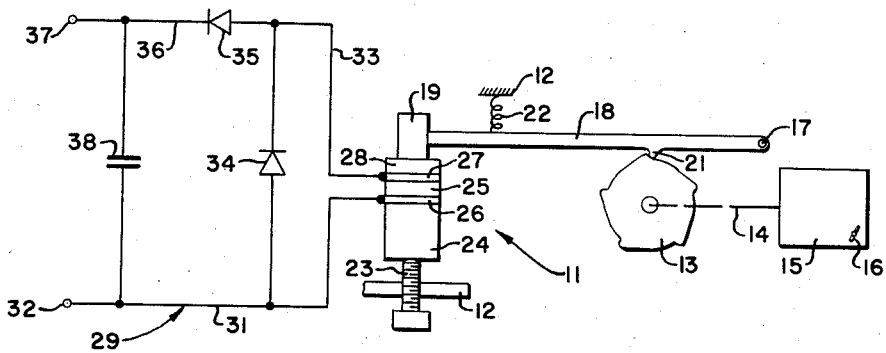
Fig. 1 is a schematic representation of the mechanical means and the circuits comprising one embodiment of the invention which employs rectifiers in the circuits.

Referring now to the drawing, wherein like reference characters designate like or corresponding parts throughout several views, there is shown in Fig. 1 schematically one embodiment of the invention generally designated 11 which comprises a suitable body or frame 12. Housed within the body or frame is a rotatable toothed cam wheel 13 operatively connected by a suitable drive connection 14 to manually-powered drive means 15, for example, a spring motor, such as a clock mechanism or the like, having the conventional hand winding means 16.

Supported within the body or frame 12 for pivotal movement, by means including a pivot 17, is a lever 18 carrying a hammer head 19 at one end thereof and spaced from pivot 17, the lever having a projection 21 thereon which rides on the periphery of the cam wheel 13, whereby pivotal movement is imparted to the lever and the hammer head, against the force of a compression spring 22 interposed between lever 18 and a portion of frame 12.

Adjustably supported within the body or frame 12, by means including a threaded element 23, is an anvil 24 which supports a piezoelectric element or disc 25, such as a polarized polycrystalline ceramic disc consisting essentially of barium titanate or the like. Interposed between the piezoelectric element and the anvil is an electrode 26 of suitable material, such as silver or the like, and a similar electrode 27 abuts the opposite side of the element. Disposed next to electrode 27 is a metal pad 28, said pad and the anvil being composed of suitable material such as aluminum or the like.

The piezoelectric element and the associated anvil, pad and electrodes are disposed with the pad in the path of movement of the hammer head 19 so that intermittently or periodically the hammer head delivers a blow to pad 28 which transmits the force of the blow to the piezoelectric element or disc 25 thereby deforming the same and generating electrical energy.

Through the medium of the electrodes 26 and 27, an electrical circuit designated generally by numeral 29 is connected to the piezoelectric element or disc 25. Circuit 29 comprises a lead 31 connected to electrode 26 and to a terminal 32 and a lead 33 connected to electrode 27. Connected across leads 31 and 33 is a rectifier 34, and one terminal of a rectifier 35 is connected to lead 33, the other terminal of rectifier 35 being connected to a lead 36 which terminates in a binding post or terminal 37. Connected across leads 31 and 36 is a capacitor or condenser 38.

The operation of the invention embodied in Fig. 1 will now be described. When a load in the form of swinging hammer head 19 is impressed on the piezoelectric element or barium titanate disc 25 through pad 28, an electrical charge develops between the electrodes 26 and 27. In setting up the device, the piezoelectric element or disc 25 is so oriented that this charge is of the proper polarity to flow through rectifier 35 and distribute itself between the capacitance of the condenser 38 and that of the element, the condenser being chosen so as to have a much larger capacitance than that of the piezoelectric element so that most of the charge goes to thte condenser with each blow of hammer head 19 and consequent deformation of the element or disc 25. As the load is relieved by withdrawal of hammer head 19 from pad 28, a charge of opposite polarity tends to develop between the electrodes 26 and 27 but this is drained off through rectifier 34. This cycle may be repeated as often as is desired and each cycle will contribute to the charge on the condenser. Thus, a charge of substantially high potential may be built up on condenser 38 to be used for whatever purpose desired; for example, the firing of a gaseous discharge tube or the detonation of an explosive train.

Figure 2:
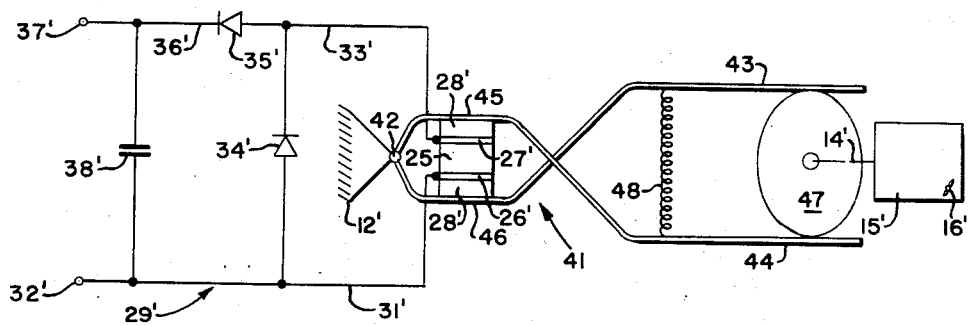
Fig. 2 is similar to Fig. 1 but the mechanical means is different.

In the modification schematically represented in Fig. 2, a different mechanical means for impressing a load on the piezoelectric element or disc 25 is employed and comprises a force multiplying device, generally designated by reference numeral 41, which includes a pivot 42 suitably supported within a body or frame 12'. The device also includes a pair of elongated handle-like elements 43 and 44 and a pair of relatively shorter elements 45 and 46 which constitute jaw members. The piezoelectric element or disc 25 has associated therewith electrodes 26' and 27' and force transmitting pads 28' and this assembly is disposed between the aforesaid jaw members and is adapted to be pressed therebetween.

Disposed between elongated elements 43 and 44, and in engagement therewith, is a rotatable cam 47, elliptical in form or of other desired shape, driven by a suitable connection 14' from mechanical drive means 15' such as a spring motor or the like, and hand-wound by conventional means 16'. A tension spring 48 interconnects elements 43 and 44 and tends to urge the elements into contact with cam 47. Rotation of cam 47 serves to spread apart elements 43 and 44 intermittently or periodically to impress a load on disc 25, spring 48 tending to draw the elements together; the cam and the spring acting alternately in a well-known manner.

To electrodes 26' and 27' there is connected a circuit 29' similar to circuit 29 of Fig. 1. In the circuits, like elements are referenced by the same numerals but the numerals of the elements in circuit 29' are primed.

The operation of the machine shown in Fig. 2 to build up a charge on condenser 38' is substantially the same as the embodiment of Fig. 1 except that the load is impressed on the piezoelectric element or disc 25 by the nutcracker-like device 41 instead of by a swinging hammer head.

Figure 3:
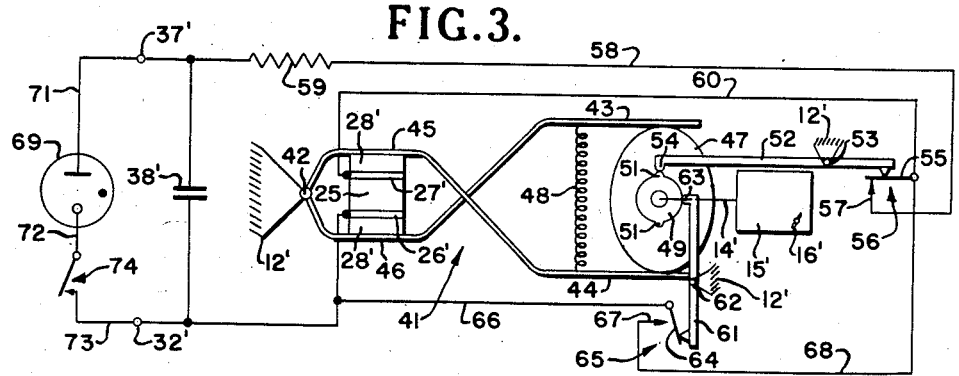
Fig. 3 is a view like Fig. 2 wherein switches are employed instead of rectifiers and in which the invention is shown applied to a gaseous discharge tube for firing the same.

The embodiment schematically illustrated in Fig. 3 is similar to Fig. 2 but differs therefrom in that a system of switches is employed in place of the rectifiers 34' and 35'. Accordingly, in Fig. 3, reference numerals 12', 14', 15', 16', 25, 26', 27', 28', 32', 37', 38' and 41 through 48 refers to like or corresponding parts shown in Fig. 2 and will not be further described in greater detail.

Associated with cam 47 to rotate therewith is rotary part 49 which is provided with a pair of diametrically opposite cam elements 51.

A pivoted lever 52 is suitably supported from a part of the body or frame by a pivot 53. One end of lever 52 carries conventional cam follower means 54 adapted to be engaged by cam elements 51 to swing the lever periodically; the usual means such as a spring or the like, being provided to hold means 54 normally in contact with part 49. The other end of the lever is operatively connected to move a movable contact element 55 which forms part of a normally open means 56.

Switch means 56 also includes a fixed contact 57 connected to a lead 58 which is connected to one side of a resistor 59, the other side of the resistor being connected to terminal 37' and to one side of condenser 38'. A lead 60 interconnects movable contact element 55 and electrode 26'.

Another pivoted lever 61 is mounted by means of pivot 62 on a part of the body or frame, which lever is provided at one end thereof with the usual cam follower means 63 normally held in contact with part 49 by conventional means and adapted to be engaged by cam elements 51 to swing the lever. The other end of lever 61 is operatively connected to move a movable contact element 64 of a normally open switch means 65, which element is connected by a lead 66 to electrode 26'. Lead 66 terminates in binding post 32' and is also connected to the other side of condenser 38'.

Switch means 65 also includes a fixed contact 67 which is connected by a lead 68 to lead 60 thereby establishing a circuit between the faces of the piezoelectric element or disc 25.

Fig. 3 illustrates one of the uses to which applicant's invention may be put. In this case, a gaseous discharge flash tube 69 is connected by a lead 71 to terminal 37'; tube 69 also being connected to terminal 32' by means of leads 72 and 73 and normally open switch means 74.

In the operation of the modification shown in Fig. 3, cam 47 is rotated by the power of the drive means 15' and intermittently or periodically spreads apart elongated elements 43 and 44 and thereby exerts pressure through jaw members 45 and 46 upon pads 28' which transmit the pressure to the piezoelectric element or disc 25 to deform the same and cause an electrical charge to develop between the electrodes 26' and 27'. The parts are so coordinated that at the instant when the pressure upon the element or disc 25 is at its maximum, switch means 56 is closed by swinging of lever 52 in one direction due to the cam follower means thereof being engaged by one of the cam elements 51. As cam 47 continues to rotate, elements 43 and 44, under the urging of spring 48, will approach each other and lever 52 will swing in the opposite direction to permit the switch means 56 to open, continued rotation of cam 47 causing the cam element 51 to swing lever 61 to move and close switch means 65, when the pressure exerted upon the piezoelectric element 25 by the jaw members 45 and 46 is completely relieved. In assembling the parts, the polarized disc 25 is so oriented that when the maximum pressure is being applied thereto by jaw members 45 and 46 and switch means 56 is closed, the charge which develops on the disc flows by way of lead 60, closed switch means 56, lead 58 and resistor 60 to condenser 38' and distributes itself between the condenser and the disc, as hereinbefore described. When the jaw members 45 and 46 have been spread apart by the action of the cam 47 and spring 48, and switch means 65 is in closed position, the charge of opposite polarity which tends to develop drains off by way of lead 66, switch means 65 and leads 68 and 60, similarly as in the other embodiments.

One of the operations in which applicant's invention may be employed is illustrated in Fig. 3 and the charge on condenser 38' is adapted to be discharged through the gaseous discharge flash tube 69 by closing the normally open switch means 74 to fire the tube. Closing of switch means 74 may be coordinated with the opening of the shutter of a camera so that the flash resulting from firing the tube will furnish necessary light in taking a photograph with the camera.

Other uses to which the invention may be put include incorporation of the device in an underwater ordnance item such as a mine or a torpedo. The drive means may be provided with means responsive to hydrostatic pressure which release the power in the wound spring motor, whereby the condenser is not charged until after the ordnance item has reached a desired depth thereby providing a safety feature. The mechanical loads disclosed may be applied through a diaphragm or diaphragms, whereby a seal may be maintained more effectively than when rotary shafts are utilized to transmit motion.

It is also contemplated that a plurality of piezoelectric elements or discs may be employed, each having associated therewith suitable mechanical means for loading the same and developing an electrical charge delivered to the condenser through suitable rectifying means in order that a charge may be built thereon of sufficiently great proportions to meet the need of the operation in which the invention is being used.

While only three modifications and variations of the present invention have been disclosed, other modifications and variations are possible in light of the foregoing teaching, for example, the piezoelectric element or disc could be loaded by having a series of steel balls propelled thereagainst. Furthermore, it should be kept in mind that the modifications are shown only schematically and that the several parts are to be arranged to obtain a sufficient mechanical advantage to accomplish the purpose of the invention.

It should be understood, therefore, that the foregoing disclosure relates only to preferred embodiments of the invention and that numerous modifications or alterations may be made therein without departing from the spirit and the scope of the invention.

What is claimed and desired to be secured by Letters Patent of the United States is:

1. Flash producing apparatus comprising, in combination, a piezoelectric element, mechanical means driven by a hand-wound spring motor for intermittently deforming the element and thereby developing electrical energy, an electrical circuit connected to said element and including a condenser in parallel with the element, first rectifying means in said circuit connected in series with said element for storing the electrical energy on the condenser, a second rectifying means connected between said element and said first rectifying means across said element, and a gaseous discharge flash tube electrically connected across said condenser by means including a normally open switch, whereby the energy stored in the condenser is discharged through the tube by closing the switch.

2. An apparatus as claimed in claim 1, wherein the mechanical means comprises a force multiplying mechanism including a pair of pivoted jaw members disposed about the element and adapted to exert pressure thereon as the jaw members approach each other, a pair of elongated members connected to said jaw members and arranged to cause said jaw members to approach as the elongated members are spread apart, and a rotary cam disposed between said elongated members, rotation of said cam being adapted to spread apart said elongated members and thereby cause the jaw members to exert pressure on the element.

3. An apparatus as claimed in claim 2, wherein each of the rectifying means includes switch means, a plurality of cam elements connected with the cam and rotatable therewith, and means actuated by said cam elements for operating said switch means as the cam rotates.

References Cited in the file of this patent

UNITED STATES PATENTS

| | | |
|---|---|---|
| 2,477,596 | Gravley | Aug. 2, 1949 |
| 2,676,273 | Oestreicher | Apr. 20, 1954 |
| 2,722,631 | Bowtell | Nov. 1, 1955 |